United States Patent
Nakatani et al.

(10) Patent No.: US 7,298,966 B2
(45) Date of Patent: Nov. 20, 2007

(54) RECORDING DEVICE, RECORDING METHOD, AND COMPUTER-READABLE PROGRAM

(75) Inventors: Tokuo Nakatani, Hirakata (JP); Hideki Fukuda, Nara (JP); Makoto Serizawa, Takatsuki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 990 days.

(21) Appl. No.: 10/412,986

(22) Filed: Apr. 15, 2003

(65) Prior Publication Data

US 2003/0219235 A1    Nov. 27, 2003

(30) Foreign Application Priority Data

Apr. 16, 2002 (JP) ............................. 2002-113001

(51) Int. Cl.
*H04N 7/26* (2006.01)
*H04N 5/00* (2006.01)

(52) U.S. Cl. .................... 386/124; 386/125; 386/126

(58) Field of Classification Search ............ 386/124, 386/125–126

See application file for complete search history.

(56) References Cited

U.S. PATENT DOCUMENTS

| 6,078,727 A | 6/2000 | Saeki et al. |
| 6,118,924 A | 9/2000 | Nakatani et al. |
| 6,678,463 B1 * | 1/2004 | Pierre et al. .................. 386/83 |

FOREIGN PATENT DOCUMENTS

| JP | 11-187393 | 7/1999 |
| JP | 2001-078150 | 3/2001 |
| JP | 2001-157206 | 6/2001 |

* cited by examiner

*Primary Examiner*—Thai Q. Tran
*Assistant Examiner*—Daquan Zhao
(74) *Attorney, Agent, or Firm*—Wenderoth, Lind & Ponack, L.L.P.

(57) ABSTRACT

In a recording device, a playback buffer is provided between a TS decoder and an AV decoder and an internal memory is provided within the AV decoder. This being so, a video frame which is being played precedes a video frame which is being received, by about six frames. This time interval between reception and playback poses a problem when manual recording is performed. To solve the problem, the same video frames which are to be played by the AV decoder are stored in a record buffer. In this way, even if the time interval exists between reception and playback, the currently played video frame and subsequent video frames can be read from the record buffer and written onto an HDD.

12 Claims, 10 Drawing Sheets

RECORDING DEVICE, RECORDING METHOD, AND COMPUTER-READABLE PROGRAM

This application is based on an application No. 2002-113001 filed in Japan, the contents of which are hereby incorporated by reference.

BACKGROUND OF THE INVENTION

1. Field of the Invention

The present invention relates to a recording device for recording a digital broadcast onto a random-access recording medium such as an HDD or a DVD in compressed form, a recording method used by the recording device, and a computer-readable program that realizes the functions of the recording device. The invention in particular relates to improvements in recording digital broadcast data in response to a user's manual operation.

2. Description of the Related Art

In recent years, television broadcasting has undergone a transition from analog signals to digital signals. This ongoing transition indicates that models which provide support for digital broadcasting will become the dominant form of recording devices. In digital broadcasting, video of a television program is transmitted via a channel in compressed form. Such compressed video takes the form of transport stream (TS) packets. Digital broadcast-ready recording devices record the video onto a recording medium in this TS packet form. Since there is no quantization loss associated with encoding/decoding operations, the recording devices can record the video with high picture quality.

Meanwhile, playback of a television program which is broadcast by digital broadcasting differs from playback of a television program which is broadcast by analog broadcasting on the following point. In digital broadcasting, there is a substantial time interval between reception and playback. That is to say, a video frame which is being played back is a video frame that was received earlier than a video frame which is being received.

This time interval is caused by a buffering delay. In digital broadcast playback systems, TS packets equivalent to a time period of about one second need be accumulated in a buffer to obtain frame data which is to be decoded. This causes a buffering delay, which results in a time interval between reception and playback. This time interval between reception and playback poses a problem when the user performs manual recording. Manual recording refers to an operation of recording data which is triggered by the user's record request. The user performs manual recording while viewing playback of a video frame. The user's intension here is to record the currently-played video frame onward. However, the currently-played video frame was received well before the currently-received video frame due to the above time interval between reception and playback, so that the recording device cannot immediately obtain the currently-played video frame. This being so, the recording device begins recording from the currently-received video frame onward. This causes first several video frames to be missing in the recording. Though the number of missing video frames is not high, this is a serious detriment to the performance of digital broadcast-ready models as compared with analog broadcast-ready models. In analog broadcasting, a video frame which is being played is approximately the same as a video frame which is being received. Therefore, a loss of first several images does not occur when manual recording is performed. A failure of digital broadcast-ready models, which are supposed to be the latest in broadcast recording technology, to achieve the same function as analog broadcast-ready models may lower their popularity on the ground that the performance of digital broadcast-ready models is poorer than that of their analog counterparts. This seriously affects manufacturers' marketing strategies in expectation of replacement demand for digital broadcast-ready models.

SUMMARY OF THE INVENTION

The present invention has an object of providing a recording device that can perform manual recording without a loss of frame data even if there is a significant buffering delay.

The stated object can be achieved by a recording device which records packets onto a recording medium in response to a record request made by a user who is viewing a playback of a digital broadcast that is broadcast by sequentially transmitting a plurality of packets, the playback of the digital broadcast having a buffering delay associated with accumulation of a group of packets in a playback buffer and conversion of the group of packets into video frames to be played back, the recording device includes a record buffer, a copying unit operable to copy the group of packets into the record buffer, and a recording unit operable to, when the user makes the record request, record the (one) group of packets stored in the record buffer onto the recording medium, and further record groups of packets received following the group of packets onto the recording medium.

According to this construction, the same packets as those output to a decoder are stored in the record buffer. Therefore, when the user performs manual recording, the group of packets corresponding to the currently-played video frame is read from the record buffer and written on the recording medium. Thus, even if the currently-played video frame is a video frame that was received earlier than the currently-received video frame, video can be recorded on the recording medium without a loss of video frames.

This writing from the record buffer onto the recording medium is triggered by neither a copy operation of copying from one medium to another nor an edit operation of editing data recorded on one medium. Rather, the writing is triggered by a record operation that is performed in conventional VCRs. Accordingly, even if the user is not prepared to perform a copy operation or an edit operation or the user is only used to operating conventional VCRs, he or she can record frame data from the record buffer onto the recording medium by performing a record operation upon viewing a desired scene.

Here, if the record buffer becomes full, the copying unit may copy a newly received group of packets over an oldest group of packets in the record buffer.

According to this construction, the amount of memory can be reduced.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE INVENTION

The following describes embodiments of a recording device of the present invention. First, an example application of the recording device is explained below.

The recording device of the present invention constitutes a home server system together with a television and a remote control. The recording device is used to perform manual recording of a broadcast that is being displayed on the television.

The broadcast to be recorded here is a digital television broadcast. In digital television broadcasting, one video frame has a time length of about 33 msec (1/29.97 sec to be exact). Data represented by a video frame is frame data.

In digital television broadcasting, frame data is picture data for displaying one complete image. Picture data can be classified into three types. B (Bidirectionally Predicted) pictures are interframe-coded with reference to past and future pictures. P (Predicted) pictures are interframe-coded with reference to past pictures. I (Intra Coded) pictures are intraframe-coded using spatial frequency characteristics within one frame, without reference to other pictures. A GOP (Group of Pictures) is the smallest decodable unit in television broadcasting. A GOP includes at least one I picture and has a playback time period of around 0.5 to 1.0 sec.

Figure 1:
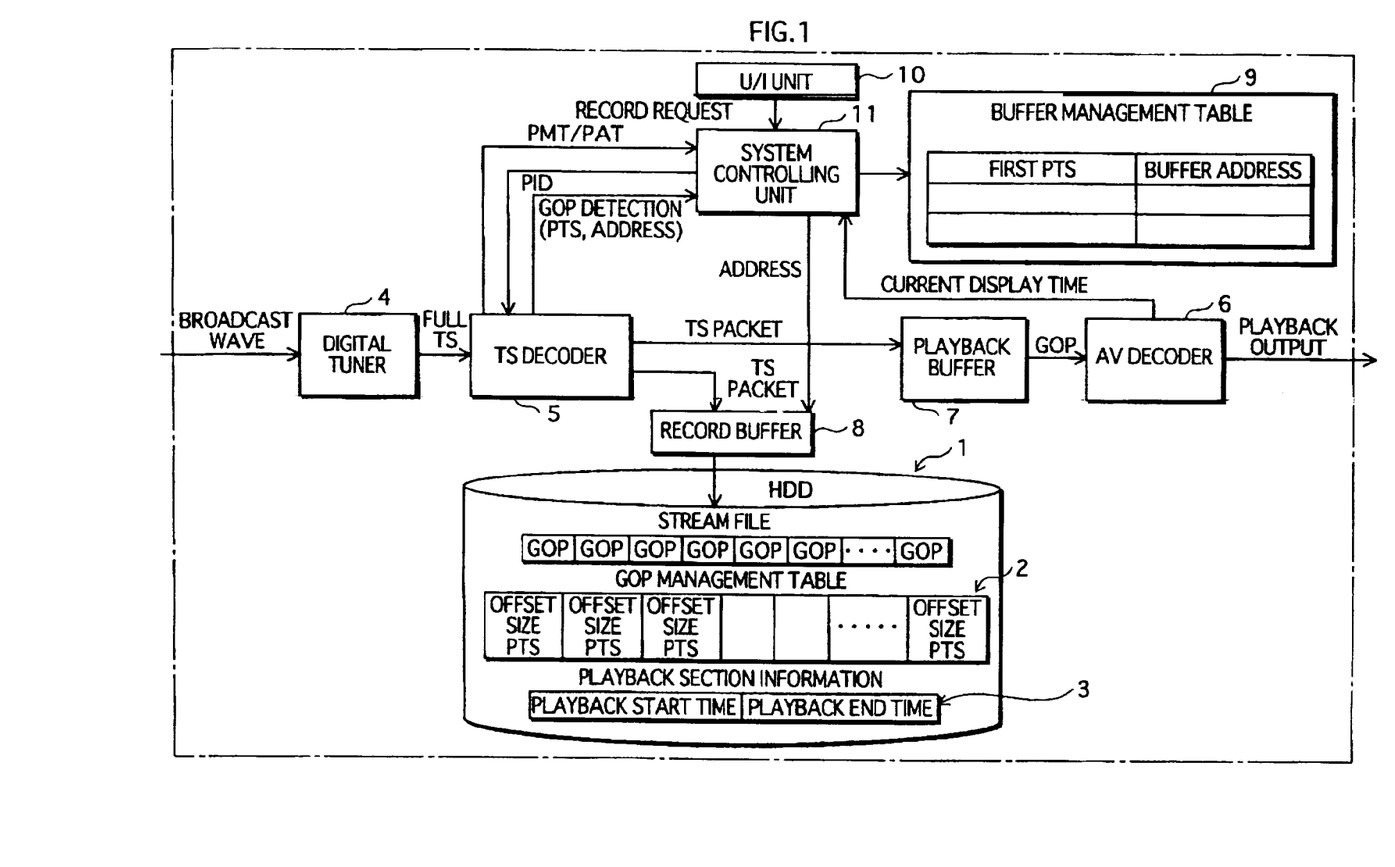
FIG. 1 illustrates an inner construction of a recording device to which the invention relates.

FIG. 1 shows an inner construction of the recording device of the present invention. As illustrated, the recording device is roughly made up of an HDD 1, a digital tuner 4, a TS decoder 5, an AV decoder 6, a playback buffer 7, a record buffer 8, a buffer management table 9, a user interface unit 10, and a system controlling unit 11.

The HDD 1 is a random-access recording medium. A stream file is recorded on the HDD 1. Also, the HDD 1 is used for storing a GOP management table 2 and playback section information 3.

The stream file stores TS packets in units of GOPs, which are recorded in accordance with the user's record request.

The GOP management table 2 contains information (a record) about each GOP stored in the stream file. Each record includes an offset of a GOP from the beginning of the stream file, a size of the GOP, and a first PTS of the GOP, and is used when special playback such as a jump is conducted.

The playback section information 3 specifies a playback section on the stream file, using a combination of a playback start time and a playback end time. The stream file stores the TS packets in units of GOPs. On the other hand, the playback start time and playback end time in the playback section information 3 specify the playback section on the stream file in units of video frames (1/29.97 sec).

The digital tuner 4 receives a digital signal transmitted from a broadcast station, and outputs a full transport stream.

The TS decoder 5 demultiplexes the full transport stream output from the digital tuner 4. In detail, the TS decoder 5 separates TS packets having a designated PID, from a plurality of TS packets that are multiplexed in the full transport stream. This is done in the following way. The TS decoder 5 receives designation of a PID from the system controlling unit 11, and writes only TS packets having the designated PID among the plurality of TS packets in the full transport stream into the playback buffer 7 and the record buffer 8. The reason of writing TS packets to not only the playback buffer 7 but also the record buffer 8 is to copy in the record buffer 8 the TS packets which are to be decoded by the AV decoder 6. Since the output speed of the TS decoder 5 is high, the TS decoder 5 can easily write one TS packet into both buffers. In addition to demultiplexing, the TS decoder 5 has a GOP detection function.

The GOP detection function is a function of detecting the beginning of a GOP in the TS packets which are obtained by demultiplexing. This is done by detecting a random access indicator in an adaptation field of a TS packet. The adaptation field shows information about a system layer of a video stream. The random access indicator shows that an access point of the video stream occurs in a payload of the TS packet. The access point is the beginning of an independent decodable unit in the video stream, that is, the beginning of a GOP. This being so, the random access indicator shows that the first frame (I picture) of a GOP exists in the payload of the TS packet. By detecting such random access indicators, it is possible to find out which TS packets constitute one GOP. This GOP detection function is not a general feature of TS decoders, but is added to the TS decoder 5 of this embodiment.

In this way, it is possible to obtain the size of each GOP in the form of TS packets.

The AV decoder 6 includes a system decoder, an audio decoder, a video decoder, and an internal buffer. The system decoder divides the TS packets obtained from the TS decoder 5, into audio data and frame data. The audio decoder decodes the audio data. The video decoder decodes the compressed frame data in the form of TS packets, to decompress it. The internal buffer is used to store frame data of two frames, to rearrange the decompressed frame data in display order. The data decoded by the video decoder and the audio decoder is sent to the television connected with the recording device.

Here, TS packets are input to the AV decoder 6 so as not to underflow the internal buffer. Basically, the broadcast station transmits the transport stream so as not to underflow the internal buffer in the AV decoder 6. Accordingly, the AV decoder 6 never underflows unless an abnormal event such as a fault on a channel occurs.

The playback buffer 7 is a dual port FIFO memory. The playback buffer 7 is provided between the TS decoder 5 and the AV decoder 6. TS packets obtained by demultiplexing in the TS decoder 5 are accumulated in the playback buffer 7. Here, TS packets stored in the playback buffer 7 are equivalent to frame data of one GOP. With the provision of this playback buffer 7, the AV decoder 6 can obtain a GOP in compressed form.

Figure 2:
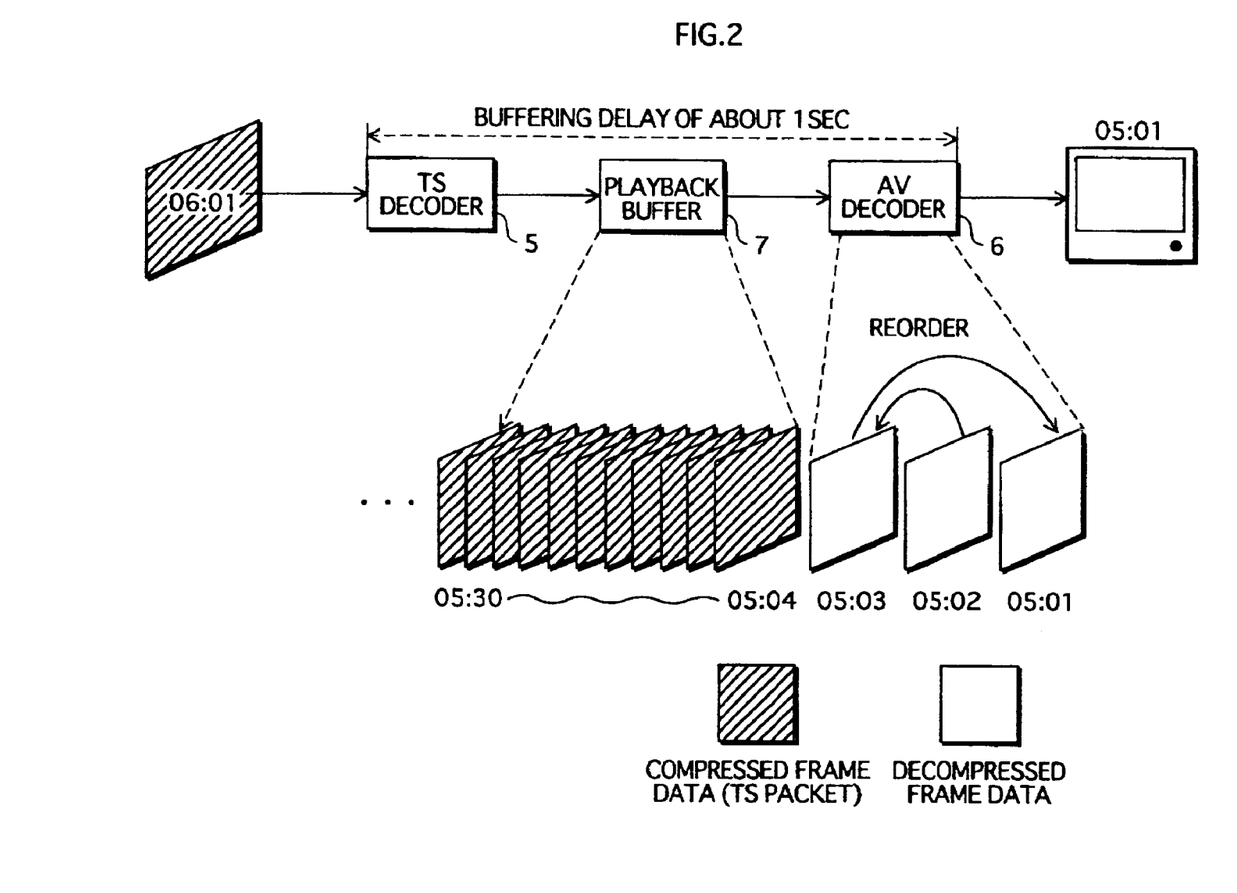
FIG. 2 illustrates a representation of a buffering delay caused by a playback buffer and an AV decoder shown in FIG. 1.

Since not only the playback buffer 7 is present between the TS decoder 5 and the AV decoder 6 but also the internal buffer is present in the AV decoder 6, the recording device has a significant buffering delay. FIG. 2 shows a representation of such a buffering delay caused by the playback buffer 7 and the AV decoder 6. In the drawing, "xx:yy" denotes the "yy"th frame of the "xx"th second (the number of frames for one second is set at 30 in this example). As can be seen from the drawing, three sets of frame data (05:01 to 05:03) of one GOP are buffered in the internal buffer of the AV decoder 6, and the remaining sets of frame data (05:04 to 05:30) of the GOP are buffered in the playback buffer 7. This being the case, there is a buffering delay of about one second between the TS decoder 5 and the television.

The record buffer 8 is a DRAM, an SDRAM, an RDRAM, or the like, and is used as a ring buffer. In more detail, the record buffer 8 stores a plurality of TS packets, from a TS packet which was received a few seconds ago up to a TS packet which is being received. Accordingly, the record buffer 8 has a size that is an integer multiple of one TS packet. The plurality of TS packets stored in the record buffer 8 constitute GOPs. Since the record buffer 8 is a ring buffer, if the record buffer 8 becomes full, the TS decoder 5 writes a new TS packet over the oldest TS packet in the record buffer. This enables the record buffer 8 to constantly store a new sequence of TS packets.

Figure 3:
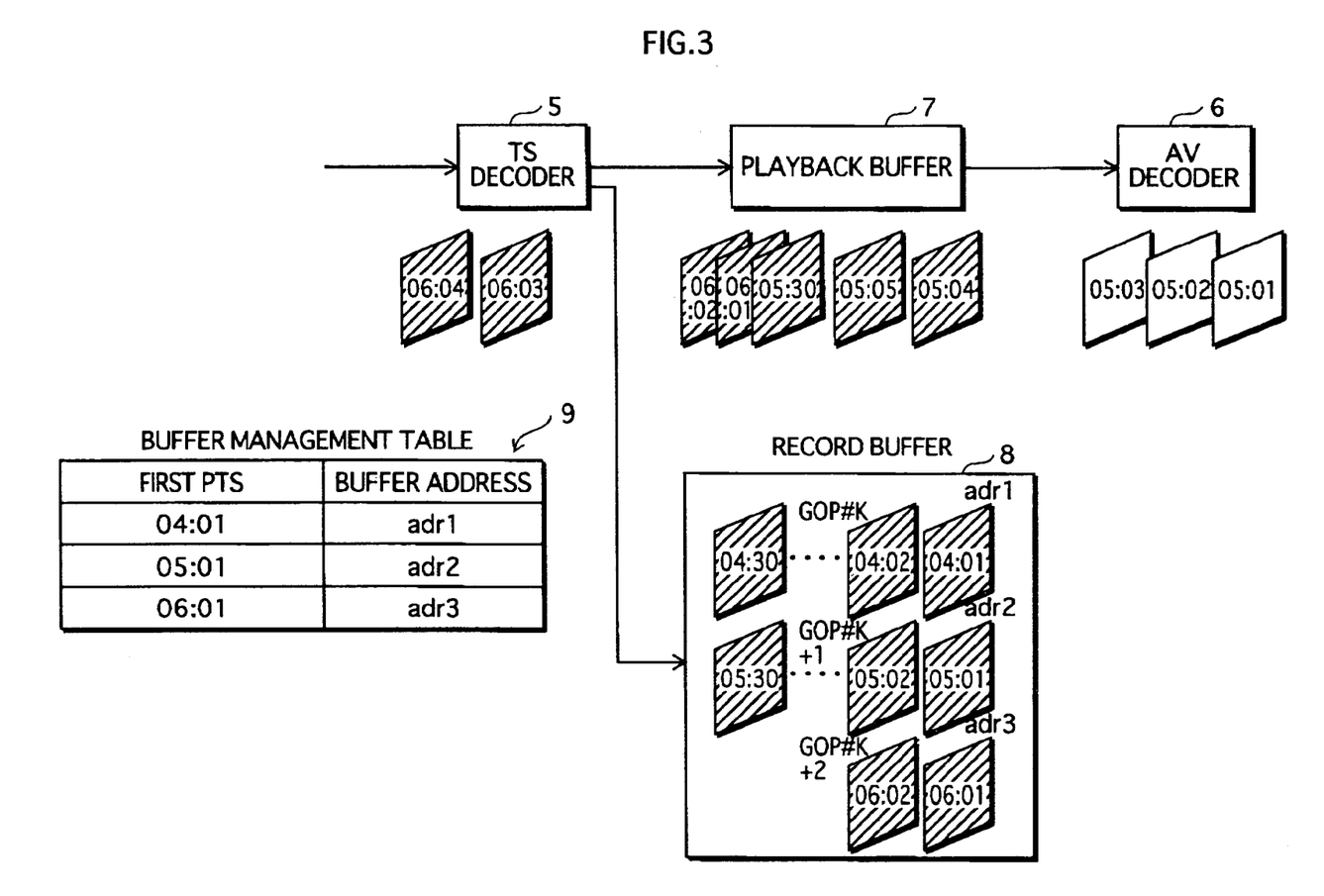
FIG. 3 illustrates frame data stored in the form of TS packets in a record buffer shown in FIG. 1, when frame data of 05:01 is being decoded by the AV decoder and frame data of 06:04 is being received by a TS decoder.

FIG. 3 shows frame data stored in the record buffer 8 in the form of TS packets, when frame data of 05:01 is being decoded by the AV decoder 6 and frame data of 06:04 is being received by the TS decoder 5. As shown in the drawing, the record buffer 8 stores TS packets corresponding to frame data of 05:01 to 05:30 (which belong to GOP#K+1). The record buffer 8 also stores TS packets corresponding to frame data of 06:01 to 06:02 (which belong to GOP#K+2) and TS packets corresponding to frame data of 04:01 to 04:30 (which belong to GOP#K).

The buffer management table 9 shows a first PTS and a start address on the record buffer 8 (buffer address), for each GOP stored in the record buffer 8. This buffer management table 9 is generated by the system controlling unit 11. The buffer management table 9 provides correspondence between PTSs and buffer addresses in the record buffer 8. This enables a buffer address of a GOP to be detected from a PTS, with it being possible to read a GOP corresponding to a video frame that is being played. The contents of the buffer management table 9 when GOP#K, GOP#K+1, and GOP#K+2 are stored in the record buffer 8 are shown in FIG. 3. In this buffer management table 9, the first PTSs (04:01, 05:01, and 06:01) of GOP#K, GOP#K+1, and GOP#K+2 are associated with the buffer addresses (adr1, adr2, and adr3) of GOP#K, GOP#K+1, and GOP#K+2.

The user interface unit 10 is a user interface that is compatible with conventional VCRs. The user interface unit 10 receives user operations such as select, record, playback, and stop, which are made by pressing keys on the remote control or front panel as in the case of conventional VCRs. When the user interface unit 10 receives a record operation from the user, writing of TS packets from the record buffer 8 onto the HDD 1 is carried out.

Figure 4:
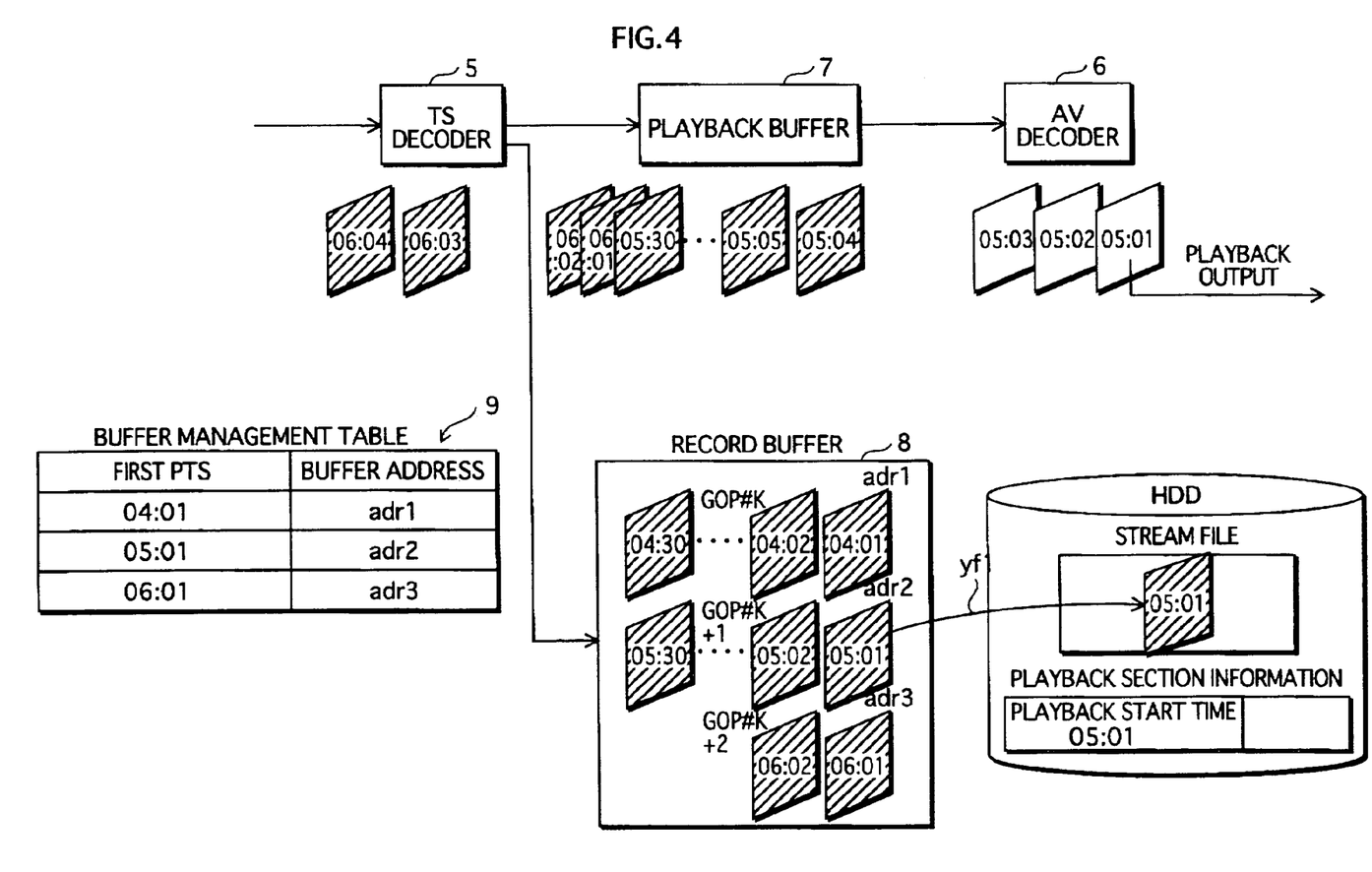
FIG. 4 illustrates frame data written in the form of TS packets on an HDD shown in FIG. 1, when frame data of 05:01 is being decoded by the AV decoder and frame data of 06:04 is being received by the TS decoder.

The system controlling unit 11 is a general-purpose microcomputer system equipped with a CPU, an ROM, and an RAM. The system controlling unit 11 has a function of controlling playback by the AV decoder 6 and a function of controlling writing onto the HDD 1. These functions are realized by the CPU executing a program stored in the ROM. In detail, the system controlling unit 11 executes the write control as follows. When the user makes a record request via the user interface unit 10, the system controlling unit 11 inquires of the AV decoder 6 about the current display time. The system controlling unit 11 then searches the record buffer 8 for a GOP which contains frame data corresponding to the current display time, and writes the GOP and subsequent GOPs onto the HDD 1 in the form of TS packets. FIG. 4 shows frame data which is written on the HDD 1 in the form of TS packets, when the frame data of 05:01 is being decoded by the AV decoder 6 and the frame data of 06:04 is being received by the TS decoder 5. As shown in the drawing, the TS packets corresponding to the frame data of 05:01 to 05:30 are stored in the record buffer 8. Since the frame data of 05:01 which is being decoded is the first frame of GOP#K+1, the frame data of 05:01 and subsequent frame data are read from the record buffer 8 and written onto the HDD 1, as indicated by arrow yf1.

The recording device having the above construction operates in the following manner.

Figure 5:
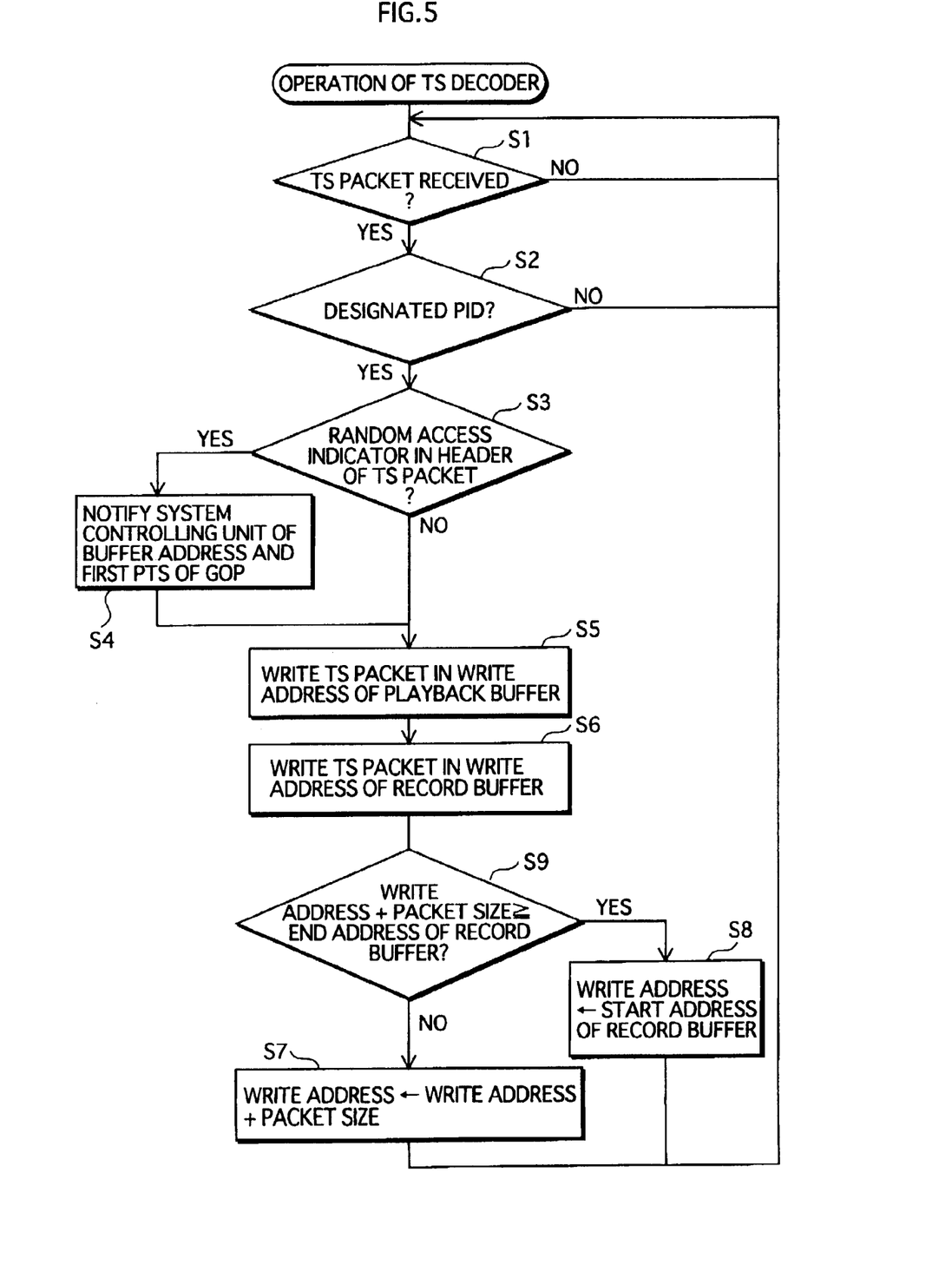
FIG. 5 is a flowchart showing an operation procedure of the TS decoder.

FIG. 5 is a flowchart showing an operation procedure of the TS decoder 5. This flowchart includes an event wait loop which waits for reception of a TS packet (S1). If a TS packet is received, steps S2-S9 are executed before returning to step S1.

Steps S2-S9 include steps S2-S4, which are followed by a step of writing the TS packet in a write address of the playback buffer 7 (S5) and a step of writing the TS packet in a write address of the record buffer 8 (S6).

In step S2, the TS decoder 5 judges whether the received TS packet has a PID designated by the system controlling unit 11. If not, the TS decoder 5 returns to step S1.

In step S3, the TS decoder 5 judges whether the header of the TS packet contains a random access indicator. If so, the TS decoder 5 notifies the system controlling unit 11 of an address and first PTS of a GOP (S4), before advancing to step S5.

Steps S7 and S8 both relate to updating the write address of the record buffer 8. Step S9 determines whether step S7 or S8 should be performed. In step S9, the TS decoder 5 judges whether the sum of the write address and the TS packet size is no smaller than the end address of the record buffer 8. If the sum of the write address and the TS packet size is smaller than the end address, the TS decoder 5 sets the sum of the write address and the TS packet size as a new write address (S7). Otherwise, the TS decoder 5 sets the start address of the record buffer 8 as a new write address (S8). As a result, the next TS packet is written over the oldest TS packet in the record buffer 8. In this way, the record buffer 8 functions as a ring buffer. In this embodiment, the size of the record buffer 8 is an integer multiple of the TS packet size. Accordingly, the start address of the record buffer 8 is set as a new write address in step S8. Suppose the size of the record buffer 8 is not an integer multiple of the TS packet size. In such a case, the TS packet is divided into a first portion and a second portion, with the first portion being written from the write address up to the end address and the second portion being written from the start address.

Figure 6:
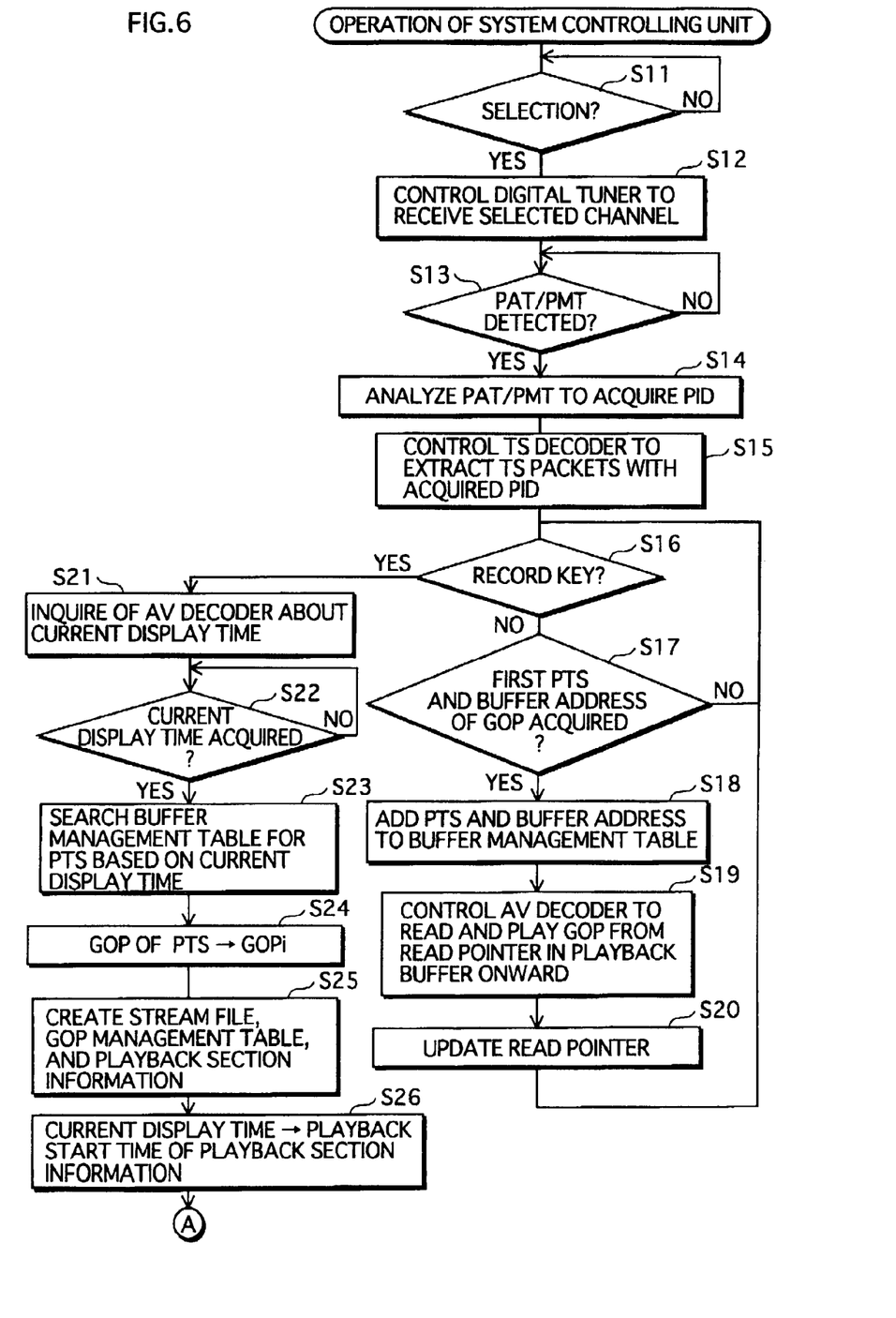
FIGS. 6 and 7 illustrate flowcharts showing an operation procedure of a system controlling unit shown in FIG. 1.
Figure 7:
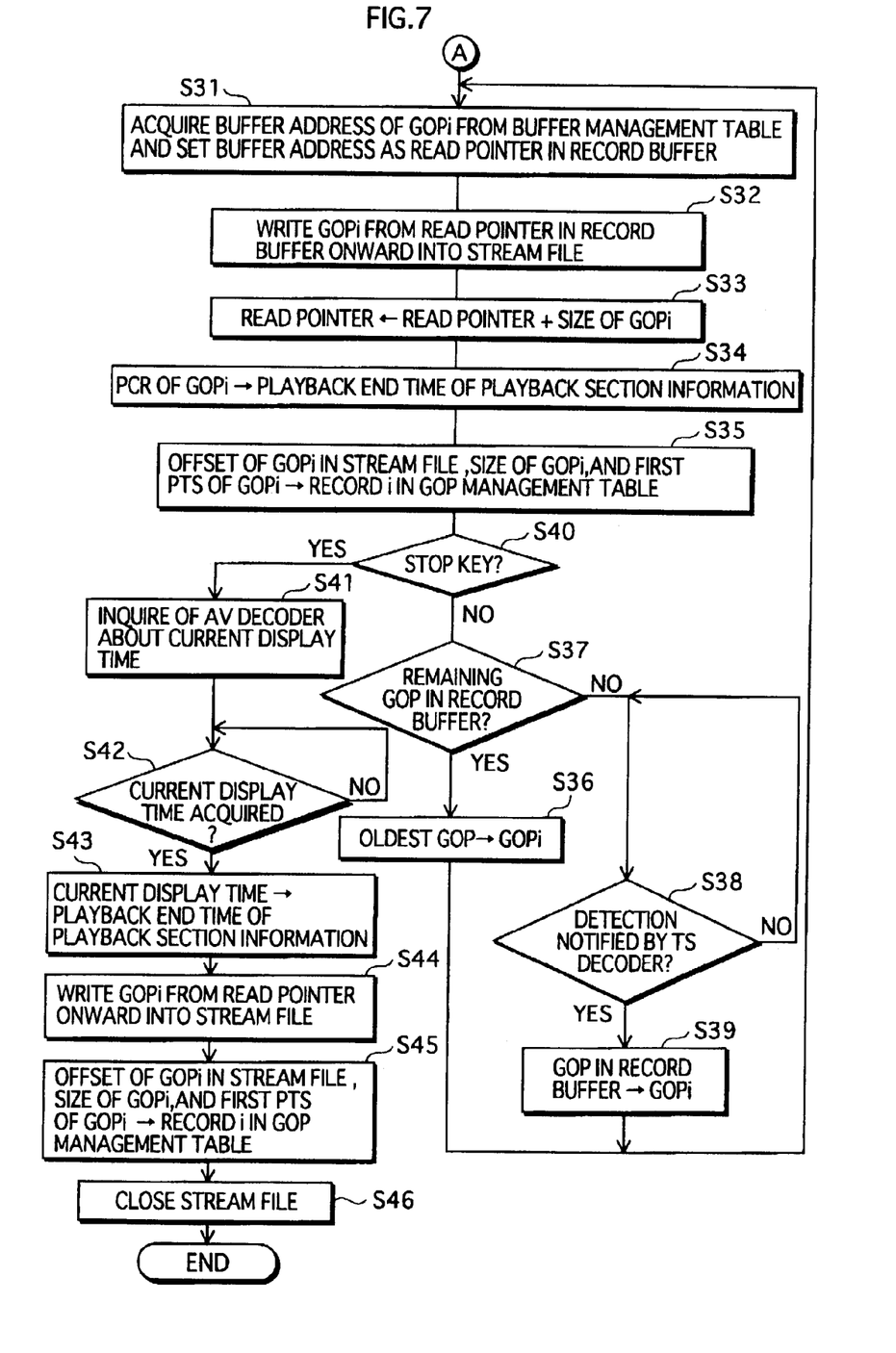

FIGS. 6 and 7 illustrate flowcharts showing an operation procedure of the system controlling unit 11. The operation of the system controlling unit 11 is predicated on the above operation of the TS decoder 5. The operation of the system controlling unit 11 is realized by the CPU reading this procedure written in a computer description language.

Steps S11 to S15 relate to designating a PID to the TS decoder 5. In detail, the system controlling unit 11 waits for the user's channel selection (S11). Upon receiving the channel selection, the system controlling unit 11 controls the digital tuner 4 to receive the selected channel (S12), and waits for detection of a PAT/PMT (S13). When the PAT/PMT are detected, the system controlling unit 11 analyzes them to acquire a PID (S14). The system controlling unit 11 then controls the TS decoder 5 to extract TS packets having this PID (S15). Following this, the system controlling unit 11 performs a loop of steps S16 and S17. This loop is an event wait loop which waits for the user to press a RECORD key (S16) or for the TS decoder 5 to acquire a first PTS and buffer address of a GOP (S17). If the first PTS and buffer address of the GOP are notified by the TS decoder 5 (S17: YES), the system controlling unit 11 writes them to the buffer management table 9 (S18). The system controlling unit 11 then controls the AV decoder 6 to read and play a GOP from the read pointer of the playback buffer 7 onward (S19). The system controlling unit 11 updates the read pointer of the playback buffer 7 (S20), and returns to the loop of steps S16 and S17. As a result of steps S16-S20, images are sequentially displayed on the television for the user to view.

If the user presses the RECORD key (S16: YES), the system controlling unit 11 begins writing GOPs onto the HDD1. Steps S21-S24 are executed prior to this GOP write operation, to specify a GOP (GOPi) to be written onto the HDD 1. In detail, the system controlling unit 11 requests the current display time (S21) from the AV decoder 6. Having acquired the current display time (S22: YES), the system controlling unit 11 searches the buffer management table 9 for a PTS that is earlier than and closest to the current display time (S23). The system controlling unit 11 then sets a GOP specified by the PTS as GOPi (S24).

Figure 8:
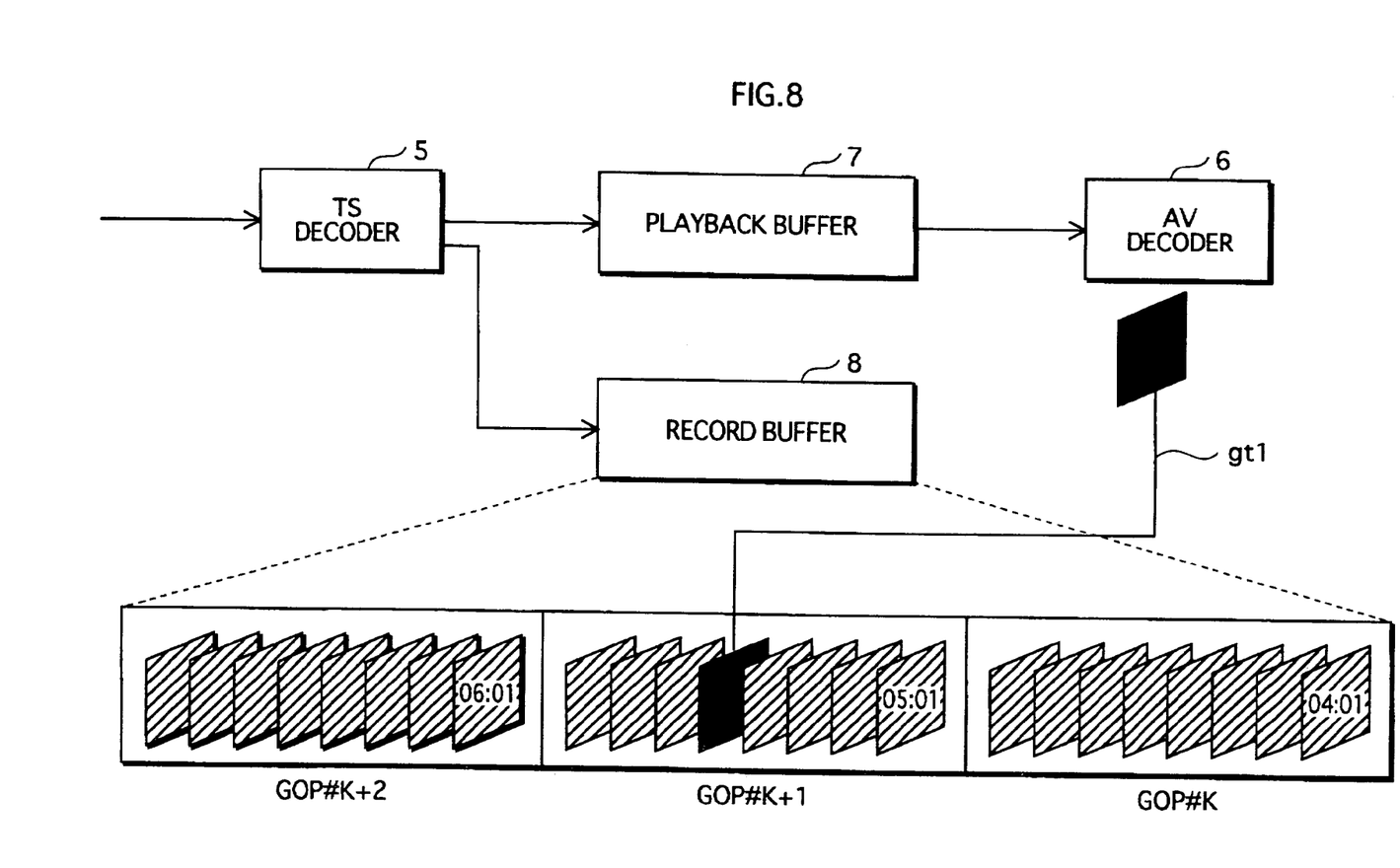
FIG. 8 illustrates a representation of a process of searching the record buffer for a GOP (Group of Pictures) based on the current display time transmitted from the AV decoder.

FIG. 8 illustrates a representation of a process of specifying a GOP in the record buffer 8 based on the current display time transmitted by the AV decoder 6. For example, suppose frame data that belongs to GOP#K+1 is being decoded by the AV decoder 6 as indicated by arrow gt1 the system controlling unit 11 obtains a buffer address of GOP#K+1 from the buffer management table 9, and sets the read pointer of the record buffer 8 to the obtained buffer address.

Steps S25 and S26 relate to creating the stream file, the GOP management table 2, and the playback section information 3. In detail, the system controlling unit 11 creates the stream file, the GOP management table 2, and the playback section information 3 (S25), and sets the current display time acquired from the AV decoder 6 as the playback start time of the playback section information 3 (S26).

After this, the system controlling unit 11 executes the GOP write operation. Steps S31-S33 relate to this GOP write operation. In detail, the system controlling unit 11 acquires the buffer address of GOPi from the buffer management table 9 and sets it as the read pointer of the record buffer 8 (S31). The system controlling unit 11 then writes GOPi from the read pointer of the record buffer 8 onward into the stream file (S32), and updates the read pointer (S33). Steps S34 and S35 relate to updating the playback section information 3 and the GOP management table 2 in association with the GOP write operation. In detail, the system controlling unit 11 sets a PCR of GOPi as the playback end time of the playback section information 3 (S34). The system controlling unit 11 then writes an offset of GOPi in the stream file, a size of GOPi, and a first PTS of GOPi to the GOP management table 2 as the ith record (record i) (S35).

The reason of setting the playback start time of the playback section information 3 in the above manner is to resolve any gap which may exist between the beginning of a GOP and the current display time. Suppose the current display time acquired from the AV decoder 6 is at some midpoint of a GOP. This being so, when playing back the video recorded on the HDD 1, it is necessary to prohibit playback of frame data from the beginning of the GOP up to that midpoint. In view of this, the playback section information 3 specifies the playback section in units of video frames, with the current display time acquired from the AV decoder 6 being set as the playback start time. By doing so, video frames which belong to the GOP but do not belong to the playback section will not be played back.

Figure 9:
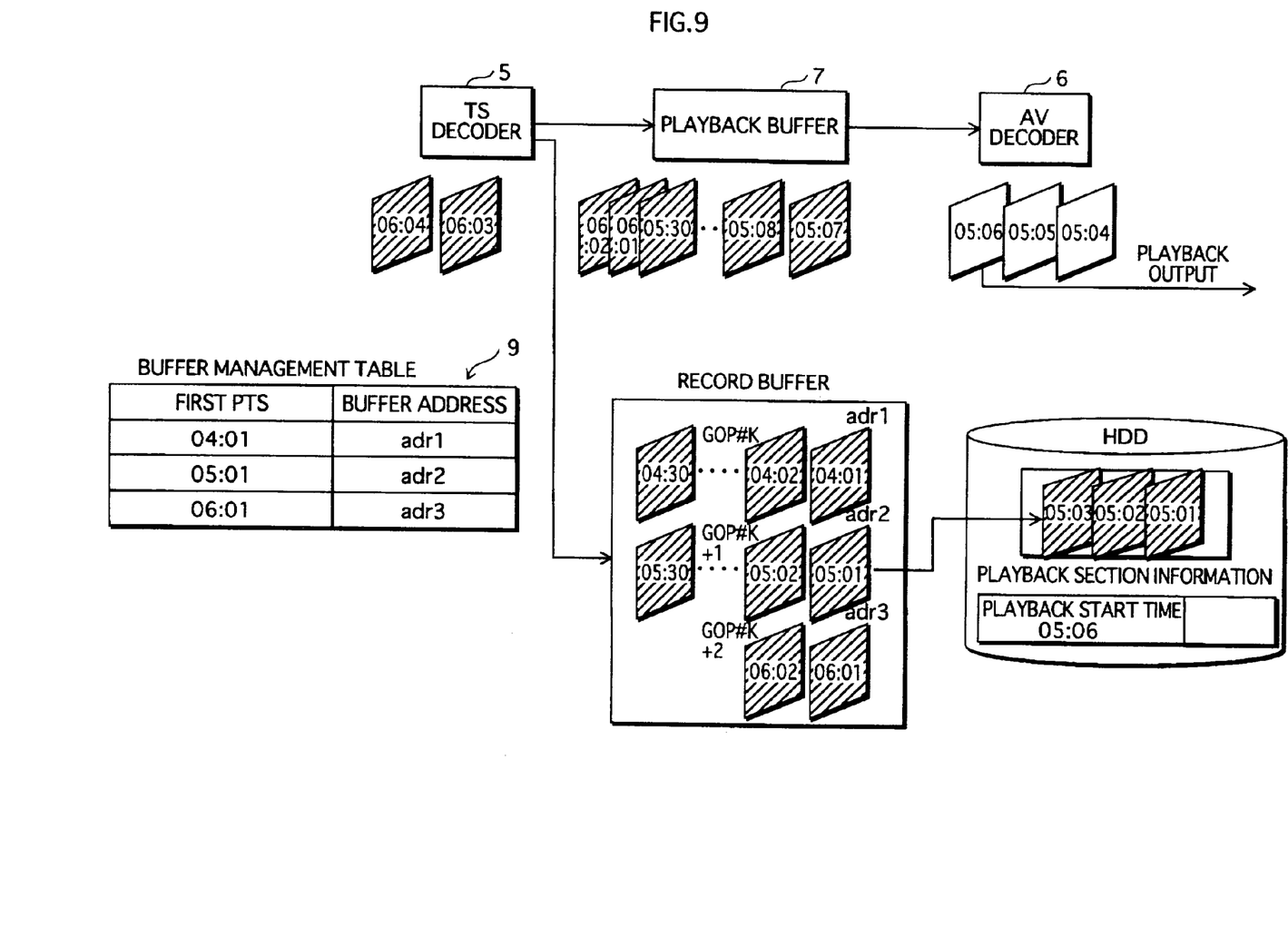
FIG. 9 illustrates frame data written in the form of TS packets on the HDD, when frame data of 05:06 is being decoded by the AV decoder.

FIG. 9 shows the stream file and the playback section information 3 in the HDD 1, when the system controlling unit 11 acquires the current display time of 05:06 from the AV decoder 6. Since the frame data of 05:06 belongs to GOP#K+1 which ranges from 05:01 to 05:30, the buffer address of GOP#K+1 is obtained from the buffer management table 9. As a result, the frame data of 05:01 that is the first frame of GOP#K+1 and subsequent frame data are written into the stream file. Meanwhile, the current display time of 05:06 is set as the playback start time in the playback section information 3.

Step S36 is a step of setting the oldest GOP among remaining GOPs in the record buffer 8 as new GOPi. After this, the system controlling unit 11 returns to steps S31-S35. Thus, steps S31-S36 are repeated if a GOP remains in the record buffer 8. In this way, the GOPs stored in the record buffer 8 are sequentially written into the stream file. In each repetition, the playback end time in the playback section information 3 is updated using a PCR of GOPi (S34), and an offset of GOPi in the stream file, a size of GOPi, and a first PTS of GOPi are added to the GOP management table 2 as record i (S35).

In step S37, the system controlling unit 11 judges whether a GOP remains in the record buffer 8. If no GOP remains in the record buffer 8, the system controlling unit 11 judges whether detection of a GOP is transmitted by the TS decoder 5 (S38). If so, the system controlling unit 11 sets the GOP which is stored in the record buffer 8 by the TS decoder 5 as new GOPi (S39), and returns to step S31.

In step S40, the system controlling unit 11 judges whether the user presses a STOP key (S40). If so, the system controlling unit 11 requests, from the AV decoder 6, the current display time (S41), and waits to receive the current display time (S42). The system controlling unit 11 then sets the current display time as the playback end time in the playback section information 3 (S43).

After this, the system controlling unit 11 writes GOPi from the read pointer onward into the stream file (S44), adds an offset of GOPi in the stream file, adds a size of GOPi, and adds a first PTS of GOPi to the GOP management table 2 as record i (S45). The system controlling unit 11 then closes the stream file (S46), thereby completing the operation.

According to this embodiment, the TS decoder 5 stores the same TS packets as those output to the AV decoder 6, in the record buffer 8. Accordingly, when the user performs manual recording, frame data which is being played can be read from the record buffer 8 and written onto the HDD 1. Thus, even if there is a time interval between reception and playback, video can be recorded onto a recording medium without a loss of video frames.

It is noted that this writing from the record buffer 8 onto the HDD 1 is triggered by neither a copy operation of copying from one medium to another nor an edit operation of editing data recorded on one medium. Rather, the writing is triggered by a record operation similar to that which is performed in conventional VCRs. This being so, even if the user is not prepared to perform a copy operation or an edit operation or the user is only accustomed to operating conventional VCRs, he or she can record frame data from the record buffer 8 onto a recording medium by performing a record operation upon viewing a desired scene.

SECOND EMBODIMENT

In the first embodiment, recording begins with a GOP that includes frame data corresponding to the current display time. However, if the frame data corresponding to the current display time is a B picture that is located in a beginning portion of the GOP, a reference I or P picture which is included in a previous GOP is needed to decode the B picture. The second embodiment deals with such a case.

Figure 10:
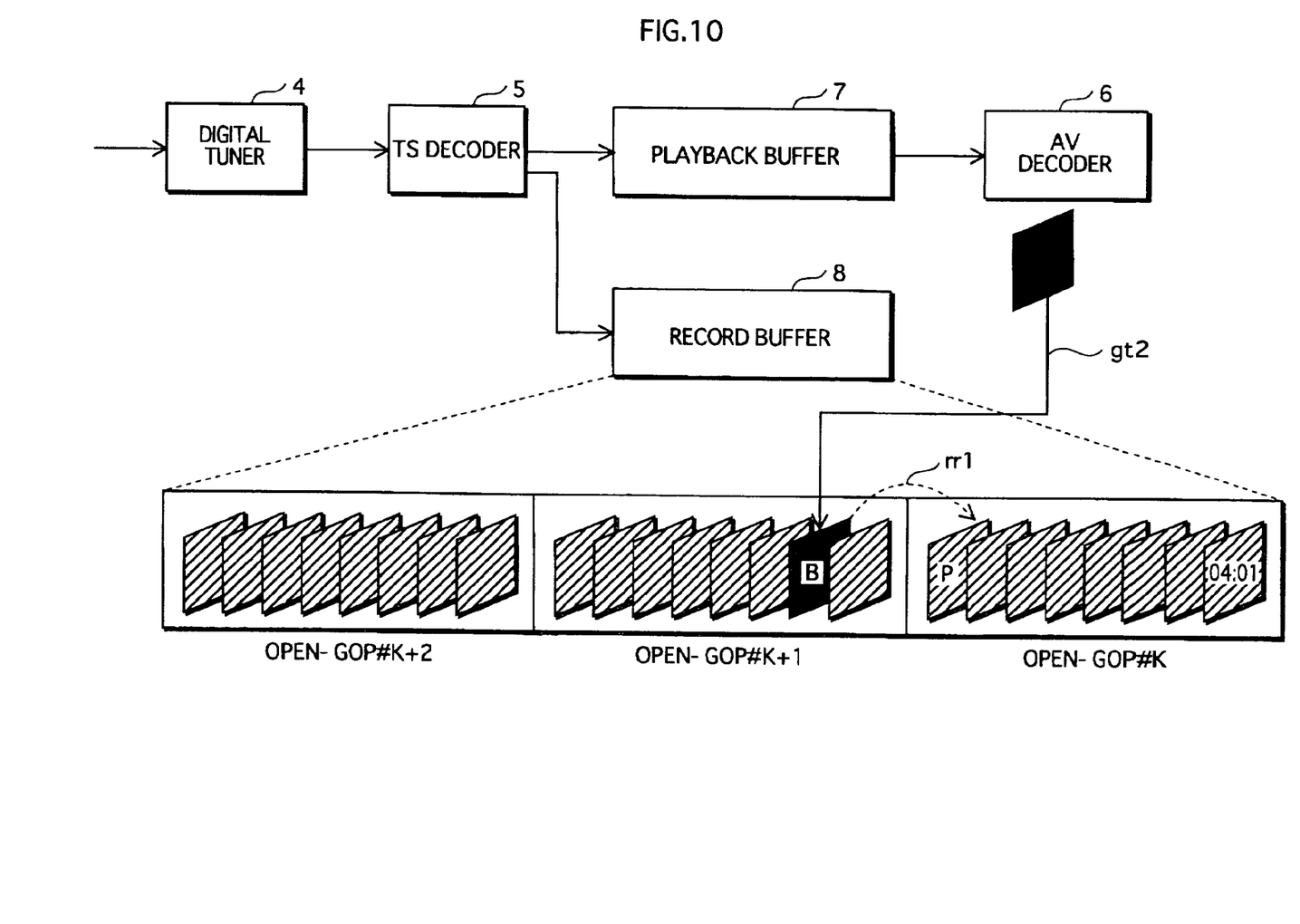
FIG. 10 illustrates a representation of a process of searching the record buffer for a GOP based on the current display time transmitted from the AV decoder, in the second embodiment of the invention.

In more detail, when the current display time is transmitted from the AV decoder 6, the system controlling unit 11 sets, not a GOP that includes frame data corresponding to the current display time, but an immediately preceding GOP, as GOPi. The system controlling unit 11 then obtains a buffer address of GOPi from the buffer management table 9, sets the read pointer of the record buffer 8 to the obtained buffer address, and writes frame data from the read pointer onward onto the HDD 1.

FIG. 10 shows a representation of a process of specifying a GOP in the record buffer 8 based on the current display time transmitted from the AV decoder 6, in the second embodiment. When frame data corresponding to the current display time belongs to GOP#K+1 as indicated by arrow gt2, not GOP#K+1 but immediately preceding GOP#K is set as GOPi. This enables the frame data corresponding to the current display time to be decoded, even when the frame data is a B picture that refers to a P picture in GOP#K as indicated by arrow rr1.

Modifications

The present invention has been described by way of the above embodiments, though these embodiments are mere examples of systems that are presently expected to operate favorably. It should be obvious that various modifications can be made without departing from the technical scope of this invention. Six representative examples of such modifications are given below.

(A) The above embodiments describe the recording device that is connected with a television and put to use. As an alternative, the recording device may be integrated with a liquid crystal display. Also, the above embodiments describe the case where the TS decoder 5 and the AV decoder 6 are included in the recording device, but they may be connected to the recording device via an IEEE 1394 connector. Furthermore, the recording device may include only the system controlling unit 11 that plays a key role in the above processing.

Since the recording device of the above embodiments is an invention described in this specification, an act of manufacturing a recording device based on the inner construction of the recording device described in these embodiments is an act of making/using the present invention. Also, any act of assigning for sale or for free, leasing, or importing the recording device is an act of making/using the present invention. Likewise, an act of offering for assignment or lease of the recording device using storefront displays, catalogs, or brochures is an act of making and/or using the present invention.

(B) Information processing using the programs shown in FIGS. 5 to 7 is actually realized by hardware resources such as a CPU, an MPEG encoder, and an HDD. Which is to say, the recording device of the above embodiments is realized whereby specific means that is provided with software and hardware performs information processing in accordance with the intended use.

Given that the information processing by the programs is actually realized by the hardware resources, the programs shown in the above flowcharts can be regarded as a creation of technical ideas by which a law of nature is utilized. This means the programs themselves are an invention. In other words, the procedures shown in the above flowcharts represent an act of making and/or using the programs of the present invention.

The above embodiments describe the case where the programs are incorporated in the recording device. However, the programs can be used independently of the recording device. Acts of making and/or using the programs include (1) an act of manufacturing, (2) an act of assigning for sale or for free, (3) an act of leasing, (4) an act of importing, (5) an act of providing to the public via a bi-directional electronic communication network, and (6) an act of offering for assignment or lease using storefront displays, catalogs, or brochures.

Examples of the act (5) include an act in which a provider sends a program to a user (program download service) and an act in which a provider provides only the function of a program to a user via an electronic communication network without sending the program itself (function provision ASP service).

(C) The time elements of the steps which are executed in a time series in each of the above flowcharts can be regarded as the necessary elements of the present invention. This being so, a recording method shown by these flowcharts is an invention. If the processing shown in each flowchart is carried out by performing the steps in a time series so as to achieve the intended use, this is an act of making and/or using the recording method of the present invention.

(D) The above embodiments describe an example where an HDD is used as a recording medium. However, the present invention is not limited to the use of this recording medium. The same effects can still be achieved even when other recording media which have a capacity of recording a broadcast program like an HDD are used. Examples of such recording media include: an optical disc such as a CD-R, a CD-RW, a DVD-R, a DVD-RW, a DVD-RAM, a DVD+R, a DVD+RW, or a Blue-ray disc; a magneto-optical disc such as a PD or an MO; a semiconductor memory card such as an SD memory card, a CompactFlash card, a SmartMedia card, a Memory Stick card, a MultiMediaCard, or a PCMCIA card; a magnetic disk such as a flexible disk, SuperDisk, Zip, or Clik!; and a removable HDD such as ORB, Jaz, SparQ, SyJet, EZFley, or Microdrive.

(E) The above embodiments describe the case where the TS decoder 5 writes frame data to both the playback buffer 7 and the record buffer 8 since the input speed of the playback buffer 7 from the TS decoder 5 is higher than the output speed of the playback buffer 7 to the AV decoder 6. However, if the output speed of the playback buffer 7 is as high as the input speed of the playback buffer 7, frame data may be recorded on the HDD 1 directly from the playback buffer 7.

(F) The above embodiments describe the case where TS packets are recorded on the HDD 1 as they are, but TS packets to which extension headers have been added may instead be recorded.

Such an extension header is called TP_extra_header. A TP_extra_header includes an Arrival_Time_Stamp and a copy_permission_indicator, and has a data length of 4 bytes.

An Arrival_Time_Stamp shows a time at which a TS packet reaches the recording device. The Arrival_Time_Stamp is used as a reference to time stamps such as PCRs and PTSs when playing back a stream. In general, PCRs and PTSs are set in an MPEG2 transport stream transmitted from a broadcast station on a presumption that the transport stream is received and played in real time. In the case of store-and-playback mode, however, an MPEG2 transport stream is stored on an HDD and played back after a substantial time delay. In such a case, the PCRs and PTSs which are set on a presumption that the transport stream is played in real time are invalid. In view of this, the Arrival_Time_Stamp in the TP_extra_header shows a time at which the TS packet reaches the recording device. By referring to this Arrival_Time_Stamp, even in store-and playback mode it is possible to play an MPEG2 transport stream by controlling the playback rate using PTSs and PCRs, as in the case of real time playback mode.

A Copy_permission_indicator is copy control information used in MPEG2 digital transport streams. "00" indicates normal copy free, "11" indicates copy no more, "01" indicates unconditional copy free in encrypted form, and "10" indicates EPN-asserted copy free.

TS packets with extension headers are grouped in units of 32 and written in three sectors. A group of 32 TS packets with extension headers is 6144 bytes (=32×192(=188+4)), which is equal to the size of three sectors (=2048×3).

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A recording device for receiving a digital broadcast, which is a sequential transmission of a plurality of packets, and for recording groups of the plurality of received packets onto a recording medium in response to a record request made by a user viewing a playback of the digital broadcast, wherein the playback of the digital broadcast includes a buffering delay associated with an accumulation of a group of the plurality of packets of the digital broadcast in a playback buffer and associated with a conversion of the group of packets into video frames to be played back, said recording device comprising:

a record buffer operable to store the groups of the plurality of packets of the digital broadcast;

a copying unit operable to receive and copy the groups of the plurality of packets of the digital broadcast into said record buffer; and a recording unit operable to, when the user makes the record request, record one group of packets of the groups of packets stored in said record buffer onto the recording medium and operable to further record subsequent groups of packets, being subsequent groups of packets from the sequential transmission following the one group of packets which are subsequently copied into said record buffer by said copying unit, onto the recording medium, wherein:

said record buffer is operable to store a preceding group of packets, which is a group of packets preceding the one group of packets from the sequential transmission;

said recording device further comprises a buffer management table operable to associate a display start time of video frames, which is a time corresponding to each group of packets stored in said record buffer, with an address of each group of packets in said record buffer;

said recording unit is (i) operable to acquire a display record time which is a time of a video frame which is being played back when the user makes the record request, (ii) operable to detect the display start time that is earlier than and closest to the acquired display record time from said buffer management table, wherein each group of packets recorded by said recording unit is stored in said record buffer at an address associated with the detected display start time, and (iii) operable to record, onto the recording medium, the preceding group of packets stored in said record buffer from an address of said record buffer associated with the detected display start time.

2. The recording device of claim 1, wherein if said record buffer becomes full, said copying unit is operable to copy a newly received group of packets over an oldest group of packets in said record buffer.

3. The recording device of claim 2, wherein the video frame which is being played back is a video frame which was interframe-coded using another video frame as a reference.

4. The recording device of claim 3, wherein:

the another video frame is one of the video frames corresponding to the preceding group of packets stored in said record buffer; and said recording unit also records the preceding group of packets stored in said record buffer onto the recording medium.

5. A computer-readable medium having a stored computer program causing a computer to receive a digital broadcast, which is a sequential transmission of a plurality of packets, and record groups of the plurality of received packets onto a recording medium in response to a record request made by a user viewing a playback of the digital broadcast, wherein the playback of the digital broadcast includes a buffering delay associated with an accumulation of a group of the plurality of packets of the digital broadcast in a playback buffer and associated with a conversion of the group of packets into video frames to be played back, the program causing the computer to execute a method comprising:

receiving the digital broadcast;

copying the groups of the plurality of received packets of the digital broadcast into a record buffer;

when the user makes the record request, recording one group of packets of the groups of packets stored in the record buffer onto the recording medium, and further recording subsequent group of packets, being subsequent groups of packets from the sequential transmission following the one group of packets which are subsequently copied into the record buffer by said copying onto the recording medium;

storing, onto the record buffer, a preceding group of packets, which is a group of packets preceding the one group of packets from the sequential transmission; and associating, via a buffer management table, a display start time of video frames, which is a time corresponding to each group of packets stored in the record buffer, with an address of each group of packets in the record buffer;

wherein said recording further includes:
acquiring a display record time which is a time of a video frame which is being played back when the user makes the record request;
detecting the display start time that is earlier than and closest to the acquired display record time from the buffer management table;
storing each group of packets copied by said copying to the record buffer at an address associated with the detected display start time; and
recording, onto the recording medium, the preceding group of packets stored in the record buffer from an address of the record buffer associated with the detected display start time.

6. The computer-readable medium having a stored computer program of claim 5, wherein, if the record buffer becomes full, said copying further includes copying a newly received group of packets over an oldest group of packets in the record buffer.

7. The computer-readable medium having a stored computer program of claim 6, wherein the video frame which is being playback is a video frame which was interframe-coded using another video frame as a reference.

8. The computer-readable medium having a stored computer program of claim 7, the another video frame is one of the video frames corresponding to the preceding group of packets stored in the record buffer; and
said recording further includes recording the preceding group of packets stored in the record buffer, onto the recording medium.

9. A recording method for receiving a digital broadcast, which is a sequential transmission of a plurality of packets, and recording groups of the plurality of received packets onto a recording medium in response to a record request made by a user viewing a playback of the digital broadcast, wherein the playback of the digital broadcast includes a buffering delay associated with an accumulation of a group of the plurality of packets of the digital broadcast in a playback buffer and associated with a conversion of the group of the plurality of packets into video frames to be played back, said recording method comprising:
receiving the digital broadcast
copying the groups of the plurality of received packets of the digital broadcast into a record buffer;
when the user makes the record request, recording one group of packets of the groups of packets stored in the record buffer onto the recording medium, and further recording subsequent groups of packets, being subsequent groups of packets from the sequential transmission following the one group of packets which are subsequently copied into the record buffer by said copying onto the recording medium;
storing, onto the record buffer, a preceding group of packets, which is a group of packets preceding the one group of packets from the sequential transmission; and
associating, via a buffer management table, a display start time of video frames, which is a time corresponding to each group of packets stored in the record buffer, with an address of each group of packets in the record buffer;
wherein said recording further includes:
acquiring a display record time which is a time of a video frame which is being played back when the user makes the record request;
detecting the display start time that is earlier than and closest to the acquired display record time from the buffer management table;
storing each group of packets copied by said copying to the record buffer at an address associated with the detected display start time; and
recording, onto the recording medium, the preceding group of packets stored in the record buffer from an address of the record buffer associated with the detected display start time.

10. The method of claim 9, wherein, if the record buffer becomes full, said copying further includes copying a newly received group of packets over an oldest group of packets in the record buffer.

11. The method of claim 10, wherein the video frame which is being played back is a video frame which was interframe-coded using another video frame as a reference.

12. The method of claim 11, wherein:
the another video frame is one of the video frames corresponding to the preceding group of packets stored in the record buffer; and
said recording further includes recording the preceding group of packets stored in the record buffer onto the recording medium.

* * * * *